3,304,189
SYNTHETIC PLASTER SET RETARDER
Richard A. Kuntze, Toronto, Ontario, Canada, assignor to Canadian Patents and Development Limited, Ottawa, Canada, a corporation of Canada
No Drawing. Filed Oct. 18, 1965, Ser. No. 497,544
18 Claims. (Cl. 106—111)

This application is a continuation-in-part of application Serial No. 249,558 filed January 2, 1963.

The present invention relates to a calcined gypsum plaster composition containing a plaster set retarder.

Since calcined gypsum plaster (calcium sulfate hemihydrate) hardens or sets within about thirty minutes after mixing with water in suitable proportions, it has become common practice to add retarders to the calcined gypsum to increase the length of time in which to work with the plaster slurry. The setting process is understood to consist of the hydration of the major part of the hemi-hydrate, $CaSO_4 \cdot \tfrac{1}{2} H_2O$, to the dihydrate, $CaSO_4 \cdot 2H_2O$ in an aqueous slurry, which results in the formation of a coherent mass by interlocking of the dihydrate crystals. By "setting time" is meant the time which elapses between the initial mixing of the calcined gypsum and water and the point when the dihydrate crystals have formed and interlocked to the stage where the plaster is no longer workable. The setting time can be determined by conventional procedures.

One class of retarders, as presently employed, act to delay the beginning of the setting process for a considerable length of time when present in relatively very small amounts, that is; in the order of 0.1 to 0.5% based on the weight of the calcined gypsum. In general, the most efficient retarders of this type, as conventionally employed, are high molecular weight hydrolyzed products of proteinaceous animal or vegetable waste matter of undefined composition. Since a protein hydrolysate is a mixture, the composition of which depends upon the source of the raw material and the hydrolyzing procedure, its retarding efficiency is not constant and may very considerably. The usual natural protein retarders have strong, characteristic odors; they lack storage stability; and they contribute to the formation of foam during the plaster mixing process.

A second class of retarders comprises materials, such as alcohols, in the use of which the setting process begins at the same time as with the normal plaster setting time, but a longer period is required to reach the point where the mix is no longer workable. It is believed that these compounds decrease the rate of crystallization by decreasing either the rate of solution or the solubility of the hemihydrate. Alternatively, a similar effect is obtained when the solubility of the dihydrate is increased. Both of these effects require large amounts of additives. Moreover, these additives do not provide a sufficiently long period during which the plaster remains workable and hence they are used in practice only for special applications.

It is an object of this invention to provide a calcined gypsum plaster composition containing a retarder which may be produced in a simple and convenient manner and which possesses a substantially constant and reproducible retarding efficiency.

Another object is to provide a calcined gypsum plaster composition containing a retarder having the efficiency set forth and which is substantially storage-stable, odorless, and free from tendency to foam upon mixing with water.

The retarders in accordance with the present invention are of the first class mentioned above but, in contrast to the common retarders derived from proteins, they comprise a series of simple synthetic compounds of known molecular structure. For each of such compounds, therefore, the retarding efficiency is reproducible and constant, a condition which is substantially impossible to achieve in the case of protein hydrolysates.

The retarder of the present invention may be defined as a water-soluble compound selected from the group consisting of aliphatic polyamino polycarboxylic acids of the general formula

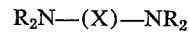
$$R_2N\text{—}(X)\text{—}NR_2$$

where X is an aliphatic chain containing at least 3 but not more than 9 carbon atoms between the terminal amino groups, and at least two R's are selected from the group consisting of lower carboxy acid groups, and the alkali metal, alkaline earth metal, ammonium and triethanolamine salts thereof, while the remaining R's are hydrogen atoms or lower alkyl groups.

The retarder of the present invention may also be defined as a water-soluble compound selected from the group consisting of aliphatic polyamino polycarboxylic acids of the general formula

$$R_2N\text{—}(CH_2)_n\text{—}NR_2$$

wherein $n$ is an integer from 3 to 9 inclusive and at least two R's are selected from the group consisting of lower carboxy acid groups and the alkali metal, alkaline earth metal, ammonium and triethanolamine salts thereof, while the remaining R's are hydrogen atoms, the retarder being present in the mix in an amount corresponding to about 0.5 to about 10 lbs. per ton of calcined gypsum plaster.

The retarder of the present invention may also be defined as a water-soluble compound selected from the group consisting of synthetic aliphatic polyamino polycarboxylic acids of the general formula

$$R'_2\text{—}(CH_2CH_2NR')_m\text{—}R'$$

wherein $m$ is an integer from 2 to 4, inclusive, and wherein at least two R"s are selected from the group consisting of acetic acid groups and the alkali metal, alkaline earth metal, ammonium and triethanolamine salts thereof, and the remaining R"s are hydrogen atoms, the retarder being present in the mix in an amount corresponding to about 0.5 to about 10 lbs. per ton of hemihydrate.

The compounds set forth have markedly improved retarding properties. They can be prepared by the carboxymethylation of aliphatic polyamines, as described in United States Patent No. 2,860,164, by substituting at least two carboxy acid groups, such as acetic and propionic, with acetic being the preferred group, for amino hydrogen atoms.

Such polyamine polycarboxylic acids differ chemically from the protein hydrolysates commonly used as plaster-retarders, and from the simple amino acids derived from them, by having carboxy acid groups bound directly to the amino groups, each acid group replacing one amino hydrogen atom.

As previously indicated, alkali salts such as lithium, potassium and sodium, alkaline earth salts such as calcium and magnesium, and ammonium and triethanolamine salts of these polyamino polycarboxylic acids are suitable for the practice of the present invention. The sodium, ammonium and triethanolamine salts are often hygroscopic and, although it has been demonstrated that these hygroscopic salts can be incorporated without difficulty into a stable premix, it is preferred in practice to use the calcium and magnesium salts which are not hydroscopic.

The mixing procedure for the retarders of the present invention may be similar to the one used with known commercial retarders, that is; a stable premix is prepared by adding the retarder as a powder to the calcined gypsum, and mixing by mechanical means prior to and after adding the usual aggregate.

The synthetic plaster retarders of the present invention are used in the approximate concentration of 0.5 to 10 lbs. per ton of calcined gypsum (0.025–0.5% by weight). The exact concentration is dependent upon several variables, such as the retarding efficiency of the particular retarder, the type of gypsum, other additives and the like.

An efficient synthetic retarder of the present invention is diethylene-triamine pentaacetic acid (DTPA) which has a retarding efficiency more than twice that of the usual natural protein retarders and which is available commercially at a price that makes it a preferred choice economically.

The uniform reproducible retarding action of a synthetic retarder of the present invention is in contrast to the nonreproducible retarding action of the usual natural protein retarders and is obtained not only because of the known chemical structure of the synthetic retarder but also because of the storage-stability of such a retarder.

In further contrast with the usual natural protein retarders, retarders of the present invention have no obnoxious odors, and they do not contribute to foaming. The absence of foaming is often advantageous. In those cases where foaming is desired, it is possible to add a desired amount of foaming agent to the retarder. In this manner, the degree of foam formation can be controlled, a condition which is not so easily regulated with the usual self-foaming natural protein retarders.

Some examples of the retarding efficiency of retarders according to the present invention are given in Table I. The setting times, as determined by the temperature method, e.g., heat of hydration measurements, were obtained by the addition of the specified amount of retarder per ton of calcined gypsum. All retarders were sodium salts unless otherwise stated.

As previously set forth, the compound employed in accordance with the invention must have 3 to 9 carbon atoms in the aliphatic chain separating the terminal amino groups. This definition (of X in the general formula) is intended to include compounds having branched chains (including the branched chains totalling more than 9 carbon atoms), providing the straight chain (or backbone portion) has 3 to 9 carbon atoms. The necessary water solubility is the criterion for the maximum number of carbon atoms permissible.

The retarding efficiency of the compounds employed in respect of the present invention is further demonstrated by Table II, which sets forth examples of setting times when employing compounds of somewhat related character but outside the scope of the present invention.

TABLE II

| Compound (as sodium salts) | Pounds Retarder per ton Calcined Gypsum | Time of Set | |
|---|---|---|---|
| | | Hours | Minutes |
| Nitrilo-triacetic acid | 10 | 1 | 33 |
| Ethylene-diamino-tetra-acetic acid | 10 | 0 | 22 |
| Imino-diacetic acid | 10 | 1 | 25 |
| Methylamino-diacetic acid | 10 | 0 | 25 |
| Antranil acid-N-diacetic acid | 10 | 0 | 23 |
| Uramil 7,7 diacetic acid | 10 | 0 | 25 |
| Ortho-benzene disulphonic acid | 10 | 0 | 25 |
| Hydroxyethyl-imino-diacetic acid | 10 | 0 | 58 |
| Trans-1,2-diamino cyclohexane tetraacetic acid | 10 | 0 | 34 |
| Ethylenebis (oxyethylene nitrilo) tetraacetic acid | 10 | 0 | 36 |
| 1,2 Propylene diamine tetraacetic acid | 10 | 0 | 27 |

The retarder of the present invention may be employed either alone or in combination with other retarders. Thus, the retarder of the present invention may be employed in combination with a conventional protein hydrolysate retarder with synergistic results. Table III lists examples showing the effectiveness of the use of the retarder of the present invntion in such combination. The retarder compound of the present invention, as employed in these examples, is a calcium salt of diethylene triamine pentaacetic acid (DTPA).

TABLE I

| Parent Polyamine | Approximate Number of Amino Hydrogen Atoms Substituted by Acetic Acid Groups | Pounds Retarder per ton Calcined Gypsum | Setting Time | |
|---|---|---|---|---|
| | | | Hours | Minutes |
| Tetramethylene Diamine | 3 | 3 | 18 | 57 |
| Hexamethylene Diamine | 4 | 3 | 8 | 15 |
| Diethylene Triamine | 2 | 3 | 5 | 45 |
| Diethylene Triamine | 5 | 3 | 37 | 17 |
| Diethylene Triamine (As calcium salt) | 5 | 3 | 41 | 22 |
| Diethylene Triamine (As magnesium salt) | 5 | 3 | 28 | 21 |
| Diethylene Triamine (As ammonium salt) | 5 | 3 | 49 | 37 |
| Diethylene Triamine (As triethanolamine salt) | 5 | 3 | 50 | 43 |
| Triethylene Tetramine | 2 | 3 | 25 | 18 |
| Do | 6 | 3 | 54 | 27 |
| Tetraethylene Pentamine | 2 | 3 | 25 | 07 |
| Do | 7 | 3 | 8 | 61 |
| Lysine | 4 | 3 | 23 | 32 |
| Cystine | 4 | 3 | 7 | 10 |
| 1,3 Propylene Diamine Tetraacetic Acid* | 4 | 5 | 14 | 26 |
| 2-Hydroxy 1,3 Propylene Diamine Tetraacetic Acid* | 4 | 5 | 18 | 25 |
| Diethylene Triamine Pentaacetic Acid* | 5 | 2 | 11 | 41 |
| 2-Ethyl 1,3 Propylene Diamine (Tetraacetic Acid)* | 4 | 5 | 14 | 35 |
| N,N'dimethyl 1,3 Propylene Diamine (diacetic acid)* | 2 | 5 | 12 | 10 |
| Di-2-Propyl-Ethylene Triamine (pentaacetic acid)* | 5 | 3 | 34 | 45 |

*As Sodium Salts.

TABLE III

| Retarder | Pounds Retarder per Ton Calcined Gypsum | Time of Set | |
|---|---|---|---|
| | | Hours | Minutes |
| DTPA | 1 | 6 | 11 |
| DTPA | 2 | 16 | 41 |
| Protein Hydrolysate | 1 | 1 | 06 |
| Do | 2 | 3 | 56 |

| Mixture | Protein Hydrolysate, lb./ton | Time of Set | |
|---|---|---|---|
| | | Hours | Minutes |
| DTPA, lb./ton: | | | |
| 0.5 | 0.5 | 8 | 21 |
| 1.0 | 1.0 | 19 | 36 |
| 2.0 | 0 | 16 | 41 |
| 1.5 | 0.5 | 18 | 15 |
| 0.5 | 1.5 | 12 | 23 |
| 0 | 2 | 3 | 56 |
| 2-hydroxy Propane Diamine 1,3-Tetraacetic Acid, lb./ton: | | | |
| 0 | 3.0 | 6 | 50 |
| 0.3 | 2.7 | 7 | 50 |
| 0.75 | 2.25 | 10 | 40 |
| 1.5 | 1.5 | 15 | 30 |
| 2.25 | 0.75 | 9 | 50 |
| 3.0 | 0 | 6 | 40 |

The protein hydrolysate retarder employed in these examples was a commercial retarder known in the trade as "National Retarder" and manufactured by National Gypsum Company.

It is evident that the concentrations of the two components in the above synergistic mixtures can be varied widely. From about 10 to 90% of each is satisfactory.

I claim:

1. An improved plaster composition comprising calcined gypsum plaster and as a plaster set retarder from about 0.025 to about 0.5% based on the weight of the plaster in the mix, of a water-soluble compound selected from the group consisting of aliphatic polyamino polycarboxylic acids of the general formula $$R_2N—(X)—NR_2$$

where X is an aliphatic chain containing at least 3 but not more than 9 carbon atoms between the terminal amino groups, and at least two R's are selected from the group consisting of lower carboxy acid groups, and the alkali metal, akaline earth metal, ammonium and triethanolamine salts thereof, while the remaining R's are selected from the group consisting of lower alkyl groups and hydrogen atoms.

2. An improved plaster composition as defined in claim 1, wherein said aliphatic polyamino compound is lysine.

3. An improved plaster composition as defined in claim 1, wherein said aliphatic polyamine compound is cystine.

4. An improved plaster composition comprising calcined gypsum plaster and as a plaster set retarder a water-soluble compound selected from the group consisting of aliphatic polyamino polycarboxylic acids of the general formula $$R_2N—(CH_2)_n—NR_2$$

wherein $n$ is an integer from 3 to 9, inclusive, and at least two R's are selected from the group consisting of lower carboxy acid groups and the alkali metal, alkaline earth metal, ammonium and triethanolamine salts thereof, while the remaining R's are hydrogen atoms, the retarder being present in the mix in an amount corresponding to about 0.5 to about 10 lbs. per ton of calcined gypsum plaster.

5. An improved plaster composition comprising calcium sulfate hemi-hydrate, and as a plaster set retarder, a water-soluble compound selected from the group consisting of synthetic aliphatic polyamino polycarboxylic acids of the general formula $$R'_2N—(CH_2CH_2NR')_m—R'$$

wherein $m$ is an integer from 2 to 4, inclusive, and wherein at least two R"s are selected from the group consisting of acetic acid groups and the alkali metal, alkaline earth metal, ammonium and triethanolamine salts thereof, and the remaining R"s are hydrogen atoms, the retarder being present in the mix in an amount corresponding to about 0.5 to about 10 lbs. per ton of hemihydrate.

6. An improved plaster composition comprising calcium sulfate hemihydrate and as a plaster set retarder a water-soluble compound selected from the group consisting of diethylene triamine pentaacetic acid, its alkali metal, alkaline earth metal, ammonium and triethanolamine salts thereof, the retarder being present in the mix in an amount corresponding to about 0.5 to about 10 lbs. per ton of hemihydrate.

7. An improved plaster composition comprising calcium sulfate hemihydrate and from about 0.5 to about 10 lbs. of the sodium salt of diethylene triamine pentaacetic acid per ton of the hemihydrate.

8. An improved plaster composition comprising calcium sulfate hemihydrate and from about 0.5 to about 10 lbs. of the calcium salt of diethylene triamine pentaacetic acid per ton of the hemihydrate.

9. An improved plaster composition comprising calcium sulfate hemihydrate and from about 0.5 to about 10 lbs. of the magnesium salt of diethylene triamine pentaacetic acid per ton of the hemihydrate.

10. An improved plaster composition comprising calcium sulfate hemihydrate and from about 0.5 to about 10 lbs. of the ammonium salt of diethylene triamine pentaacetic acid per ton of the hemihydrate.

11. An improved plaster composition comprising calcium sulfate hemihydrate and from about 0.5 to about 10 lbs. of the triethanolamine salt of diethylene triamine pentaacetic acid per ton of the hemihydrate.

12. An improved plaster composition comprising calcined gypsum plaster and as a plaster set retarder a mixture consisting of 10 to 90% by weight of a proteinaceous hydrolysate and the remainder a water-soluble compound selected from the group consisting of aliphatic polyamine polycarboxylic acids of the general formula $$R_2N—(X)—NR_2$$

where X is an aliphatic chain containing at least 3 but not more than 9 carbon atoms between the terminal amino groups, and at least two R's are selected from the group consisting of lower carboxy acid groups, and the alkali metal, alkaline earth metal, ammonium and triethanolamine salts thereof, while the remaining R's are selected from the group consisting of lower alkyl groups and hydrogen atoms, said water-soluble compound being present in the mix in an amount corresponding to about 0.5 to about 10 pounds per ton of calcined gypsum plaster.

13. The improved plaster composition as defined in claim 12, wherein said water-soluble compound is diethylene triamine pentaacetic acid.

14. In a process of effectively retarding the setting time of calcined gypsum plaster, the improvement comprising mixing with each ton of calcined gypsum plaster from about 0.5 to about 10 pounds of a water-soluble compound selected from the group consisting of aliphatic polyamino polycarboxylic acids of the general formula $$R_2N—(X)—NR_2$$

where X is an aliphatic chain containing at least 3 but not more than 9 carbon atoms between the terminal amino groups, and at least two R's are selected from the group consisting of lower carboxy acid groups, and the alkali metal, alkaline earth metal, ammonium and triethanolamine salts thereof, while the remaining R's are selected from the group consisting of lower alkyl groups and hydrogen atoms.

15. In the process of effectively retarding the setting time of calcined gypsum plaster, the improvement comprising mixing with each ton of calcined gypsum plaster from about 0.5 to about 10 lbs. of a water-soluble compound selected from the group consisting of aliphatic polyamino polycarboxylic acids of the general formula $$R_2N-(CH_2)_n-NR_2$$

wherein $n$ is an integer from 3 to 9 and at least two R's are selected from the group consisting of lower carboxy acid groups, and the alkali metal, alkaline earth metal, ammonium and triethanolamine salts thereof, and the remaining R's are hydrogen atoms.

16. In the process of effectively retarding the setting time of calcined gypsum plaster, the improvement comprising mixing with each ton of calcined gypsum plaster from about 0.5 to about 10 lbs. of a water-soluble compound selected from the group consisting of synthetic aliphatic polyamino polycarboxylic acids of the general formula $$R'_2N-(CH_2CH_2NR')_m-R'$$

wherein $m$ is an integer from 2 to 4, inclusive, and wherein at least two R''s are selected from the group consisting of acetic acid groups and the alkali metal, alkaline earth metal, ammonium and triethanolamine salts thereof, while the remaining R''s are hydrogen atoms.

17. In the process of effectively retarding the setting time of calcined gypsum plaster, the improvement comprising mixing with each ton of calcined gypsum plaster from about 0.5 to about 10 lbs. of a compound selected from the group consisting of diethylene triamine pentaacetic acid and its alkali metal, alkaline earth metal, ammonium and triethanolamine salts.

18. A gypsum plaster set retarder comprising a mixture consisting of 10 to 90% by weight of a proteinaceous hydrolysate and the remainder a water-soluble compound selected from the group consisting of aliphatic polyamino polycarboxylic acids of the general formula $$R_2N-(X)-NR_2$$

where X is an aliphatic chain containing at least 3 but not more than 9 carbon atoms between the terminal amino groups, and at least two R's are selected from the group consisting of lower carboxy acid groups, and the alkali metal, alkaline earth metal, ammonium and triethanolamine salts thereof, while the remaining R's are selected from the group consisting of lower alkyl groups and hydrogen atoms.

References Cited by the Examiner
UNITED STATES PATENTS
2,499,445    4/1950    Ammann _____ 106—315

TOBIAS E. LEVOW, *Primary Examiner.*

S. E. MOTT, *Assistant Examiner.*